J. F. HERMAN.
OVERSHOE FOR HORSES.
APPLICATION FILED OCT. 12, 1910.
991,778.
Patented May 9, 1911.
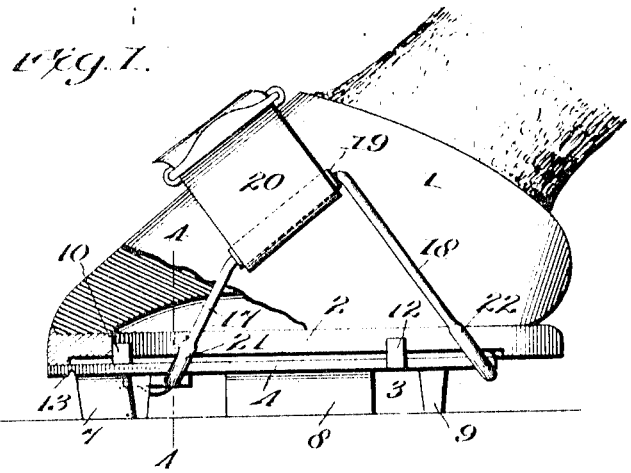
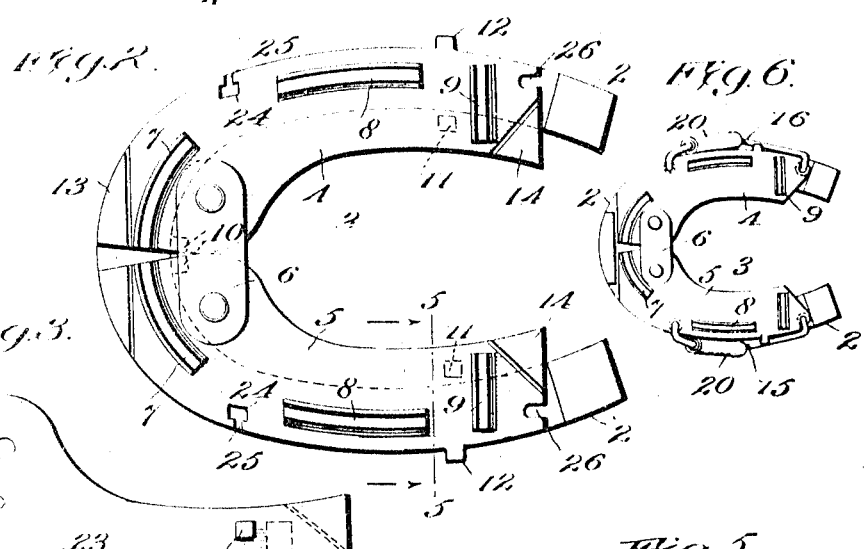
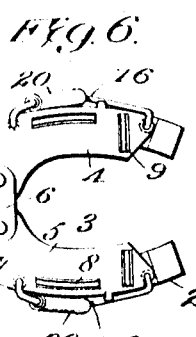
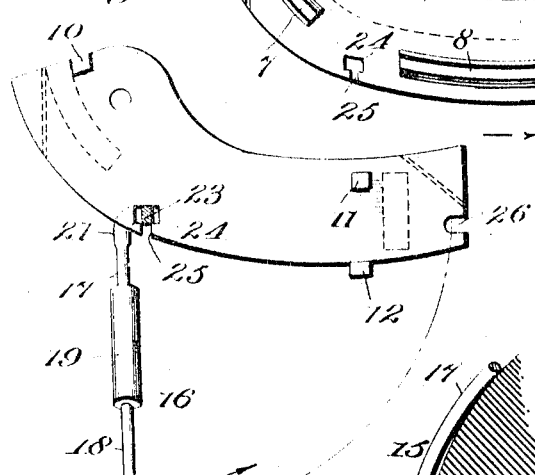
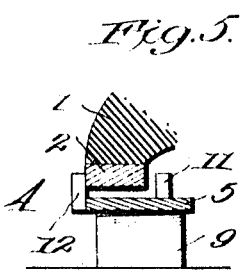
Inventor
J. F. Herman,
by Geo H Payne
Attorney
Witnesses
Byron B Collings
Edwin J Beller

UNITED STATES PATENT OFFICE.

JOSEPH F. HERMAN, OF WASHINGTON, DISTRICT OF COLUMBIA.

OVERSHOE FOR HORSES.

991,778.  Specification of Letters Patent.  Patented May 9, 1911.

Application filed October 12, 1910. Serial No. 586,723.

*To all whom it may concern:*

Be it known that I, JOSEPH F. HERMAN, a citizen of the United States, residing at Washington, in the District of Columbia, have invented new and useful Improvements in Overshoes for Horses, of which the following is a specification.

This invention relates to new and useful improvements in detachable ice creepers for horse-shoes, and has for its object the production of a simple, cheap and highly efficient device of that character which will effectively prevent the slipping of a horse on an icy or otherwise slippery roadway.

A further object is to provide an overshoe which can be readily and easily applied to a horse's foot; one in which a certain degree of adjustment may be obtained and one which may be readily secured thereon against accidental displacement.

The invention comprises the detailed construction, combination and arrangement of parts substantially as hereinafter set forth and particularly pointed out in the claims.

In the accompanying drawings forming a part of this specification:—Figure 1 is a side elevation of a horse's hoof showing an improved overshoe applied thereto, parts being broken away for the sake of clearness;
Fig. 2 is a bottom plan view of the parts shown in Fig. 1 with the side stays removed; Fig. 3 is a detail plan view of part of an overshoe showing how the side stays are secured thereto; Fig. 4 is a detail cross section on the line 4—4 of Fig. 1; Fig. 5 is a detail cross section on the line 5—5 of Fig. 2 looking in the direction of the arrows; and Fig. 6 is a bottom plan view showing parts of the toe and heel portions of the overshoe removed.

Referring to the drawings:—1 designates a horse's hoof provided with a horse-shoe 2 on the under side of which is secured my detachable overshoe 3. This overshoe is preferably of the shape shown in Fig. 2 and is composed of two plates 4 and 5 securely connected together at the toe portion by a pivoted link 6. 7; 8; and 9 represent calks cast on the bottom of the plates; and 10;
11 and 12 represent studs cast on the top of the plates. These studs are arranged as shown to prevent any forward or lateral movement when the ice creeper is in position, the stud 10 abutting against the inner side of the toe portion of the horse shoe as shown in Fig. 1 and the studs 11 and 12 abutting against the inner and outer sides of the heel portion of the horse shoe.

The toe and heel portions of the plates 4 and 5 of the overshoe are provided with weakened portions 13 and 14 adapted to be removed before fitting the overshoe to the foot of an animal provided the worm calks on the shoe may interfere with the proper fit or adjustment of the overshoe, as clearly shown in Fig. 6.

The characters 15 and 16 represent the retaining members of the overshoe and comprise a front portion 17 and rear portion 
18. The front portion 17 is slightly bent near its top to retain a roller 19 adapted to prevent the retaining strap 20 from becoming worn by constant friction when the overshoe is securely held in place, when in use. These retaining members are flexible and are reinforced at their lower ends by enlargements 21 and 22. The ends of these members are bent at right angles on themselves, to allow them to pass around the outer and under sides of the plates 4 and 5, as shown in Fig. 4. On the enlarged ends of the front portions 17 the retaining members are provided with elongated reduced portions 23 as clearly shown in Fig. 3. These reduced portions 23 are adapted to engage with the enlarged portions of the notches 24 in the toe portions of the plates 4 and 5. Connected with the notches 24 are the reduced portions 25 through which the elongated portions 23 of the retaining members are allowed to pass. The other ends 22 of the retaining members are adapted to engage with notches 26 in the heel portion of the plates 4 and 5.

By reference to Fig. 3 it will be seen that when the retaining members are to be placed on the overshoe they are first brought to the position as indicated, the reduced portions 23 are slipped into the notches 24 through the reduced portions 25 and turned at right angles, in the direction of the arrow, and the other ends 22 of the retaining members are sprung into the notches 26 thereby securely locking the same to the plates. On account of the construction of the notches and the means of assembling the retaining members it will be clearly seen that these parts will be rigidly held together in a locked position. By this construction it also may readily be seen that when the plates are worn out new plates may be attached to the retaining members thereby greatly lessening the cost of the overshoe which becomes worn out with time.

By the reason of the strap passing around the roller and the front of the hoof; by the flexibility of the stay which conforms to the shape of the hoof as shown in Fig. 4; by the arrangement of the studs to prevent any forward or lateral movement and by the fine points of adjustment, it may readily be seen that the entire overshoe is securely held and locked to the foot and the danger of the animal slipping on icy pavements and the like will be eliminated, and that by the attachment of the overshoe in time of need, a great saving of time and expense will be effected.

It is proposed to make the overshoe in different sizes, and with each size adjustable within certain degrees so as to meet all the necessary requirements of the trade.

It is not to be understood that I limit myself to the details of construction and arrangement of parts herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

What I claim is:—

1. An overshoe comprising plates provided with anti-slipping means and weakened toe and heel portions; a link pivotally connecting said plates; angular retaining members mounted on said plates and adapted to extend upwardly alongside the hoof when in use; rollers mounted on said retaining members; means connecting said retaining members for holding said overshoe over the hoof; means adapted to prevent a forward movement; and means adapted to prevent a lateral movement of the overshoe when in place, substantially as described.

2. An overshoe comprising plates provided with anti-slipping means; a link pivotally connecting said plates; said plates also provided with notches in their toe and heel portions; angular retaining members mounted in the notches on the said plates and adapted to extend upwardly alongside the hoof when in use; rollers mounted on the said retaining members; means connecting said retaining members for holding the said overshoe over the hoof; means adapted to prevent a forward movement; and means adapted to prevent a lateral movement of the overshoe when in place, substantially as described.

3. An overshoe comprising plates provided with anti-slipping means and weakened toe and heel portions; said plates being also provided with notches in their toe and heel portions, said notches in the toe portion being narrowest at the outside; angular retaining members each provided in its front portion with an elongated reduced portion which portion is adapted to be inserted into the said toe notches; said retaining members adapted to be turned at an angle of 90 degrees and the other ends of said members adapted to be sprung into said notches in the heel portions of said plates and said retaining members adapted to extend upwardly alongside the hoof when in use; means connecting said overshoe over the hoof; and means adapted to prevent a forward and means adapted to prevent lateral movements of the overshoe when in place, substantially as described.

4. An overshoe having a tread portion provided with anti-slipping means, and weakened toe and heel portions; angular retaining members mounted on said tread and adapted to extend upwardly alongside the hoof when in use; rollers mounted on said retaining members; means connecting said retaining members for holding said overshoe over the hoof; and means adapted to prevent lateral movement of the overshoe when in place, substantially as described.

In testimony whereof I have hereunto set my hand in presence of two subscribing witnesses.

JOSEPH F. HERMAN.

Witnesses:
   N. CURTIS LAMMOND,
   A. G. RUSSELL.